United States Patent [19]

Marro et al.

[11] 4,305,124
[45] Dec. 8, 1981

[54] PIPELINED COMPUTER

[75] Inventors: Daniel J. Marro; David B. Schuck, both of Escondido, Calif.

[73] Assignee: NCR Corporation, Dayton, Ohio

[21] Appl. No.: 79,027

[22] Filed: Sep. 26, 1979

Related U.S. Application Data

[63] Continuation of Ser. No. 913,996, Jun. 9, 1978, abandoned.

[51] Int. Cl.³ .............................................. G06F 7/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,462,744 | 8/1969 | Tomasulo et al. | 364/200 |
| 3,614,742 | 10/1971 | Watson | 364/200 |
| 3,713,107 | 1/1973 | Barsamian | 364/200 |
| 3,771,137 | 11/1973 | Barner et al. | 364/200 |
| 3,949,379 | 4/1976 | Ball | 364/200 |
| 4,041,461 | 8/1977 | Kratz et al. | 364/200 |
| 4,079,456 | 3/1978 | Lunsford et al. | 364/200 |
| 4,112,489 | 9/1978 | Wood | 364/200 |
| 4,135,242 | 1/1979 | Ward et al. | 364/200 |
| 4,149,242 | 4/1979 | Pirz | 364/200 |

*Primary Examiner*—Gareth D. Shaw
*Assistant Examiner*—C. T. Bartz
*Attorney, Agent, or Firm*—J. T. Cavender; Edward Dugas; Arthur A. Sapelli

[57] ABSTRACT

A pipelined computer which executes high level language instructions is disclosed. The pipelined computer includes a memory for storing the high level language instructions therein. A plurality of microprogrammed digital computers are coupled in parallel to the memory, and are also intercoupled via an interlocking bus. The microprogrammed computers, in conjunction with the interlocking bus, form a pipeline for executing the high level language instructions. Each of the computers is a separately microprogrammable stage of the pipeline.

3 Claims, 7 Drawing Figures

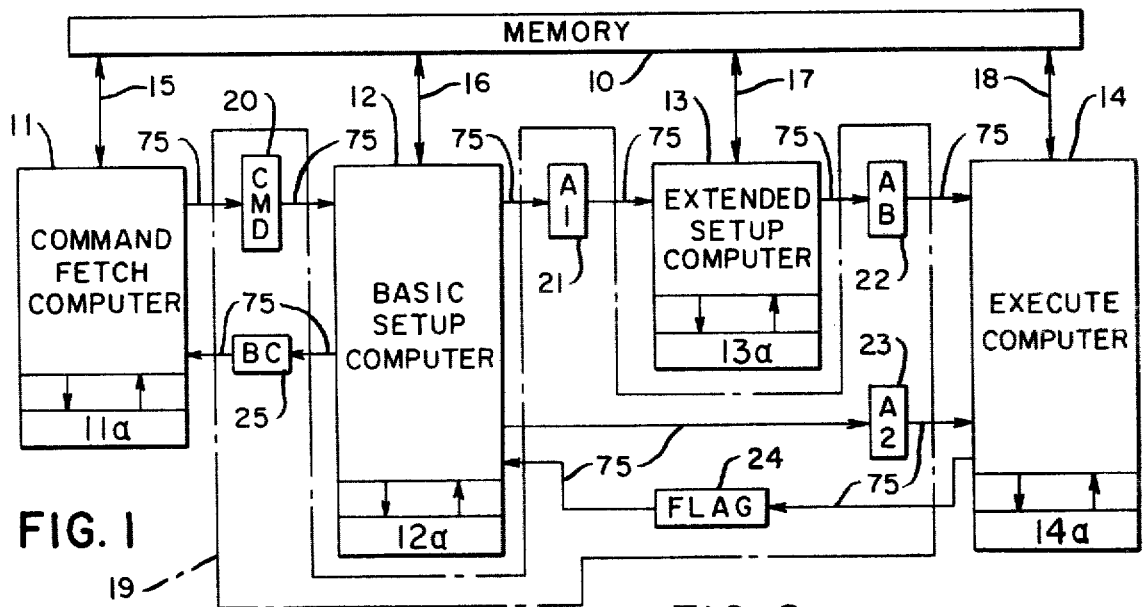

FIG. 1

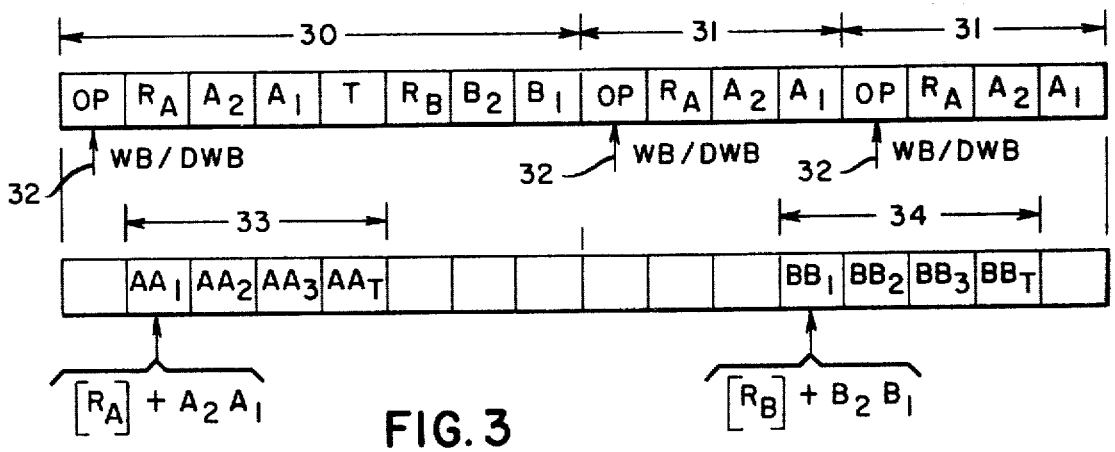

FIG. 3

| TABLE 1 - COMPUTER 11 | TABLE 2 - COMPUTER 12 |
|---|---|
| FETCH UP TO FOUR SEQUENTIAL CMDS. | COMPUTE $[R_A] + A_2A_1$ |
| FETCH ALT. CMD. IF BRANCH CMD. | COMPUTE $[R_B] + B_2B_1$ |
| ALIGN. CMDS. IN REG. 20 | HOLDS $[R_B] + B_2B_1$ FOR SUBSEQUENT SINGLE STG. CMDS. |
| SWITCH TO ALT. CMD IF BRANCH OCCURS | EXECUTES ALL BRANCH CMDS. DIRECTLY |

| TABLE 3 - COMPUTER 13 | TABLE 4 - COMPUTER 14 |
|---|---|
| FETCH ONE WORD OF AA | RECEIVE ADDRESSES OF OPERANDS FROM REG. 22/23 |
| FETCH ONE OR TWO WORDS OF BB | FETCH AND EXECUTE REMAINING OPERANDS |
| GENERATE BYTE POINTERS | SET FLAGS IN REG. 24 |

PIPELINED COMPUTER

This is a continuation, of application Ser. No. 913,996, filed June 9, 1978, now abandoned.

BACKGROUND OF THE INVENTION

The disclosed invention relates to digital computers, and more particularly to the architecture thereof. Many types of digital computers exist in the prior art. Basically however, the architecture for these computers can be classified into two categories. One category includes those computers which are totally hardwired and have no control store memory, while the other category includes those computers which are microprogrammed and have a control store memory.

Computers which do not have a control store memory have an architecture which is highly irregular. This is because these computers consist solely of a plurality of logic gates and flip-flops which are interconnected in multiple complex combinations. The multiple combinations are necessary if the computer is to execute an entire instruction set. A problem with these computers is that as the instructions set grows in size, so does the complexity of the interconnection between the gates and flip-flops which comprise the machine. This makes them difficult to design and difficult to maintain.

In comparison, processors which have a control store are relatively regular in structure. Basically, the control store provides a means for storing therein thousands of relatively simple microcommands. The hardwired logic gates and flip-flops in these computers execute these relatively simple commands. Since the commands are relatively simple, so is the logic required to implement them. Conversely, the microcommands are arranged in complex programs in the control store, and the programs execute higher level language instructions for the computer user. That is, each command of the high level language is implemented by a program of multiple microinstructions within the control store of the computer.

One problem however, with some computers having a control store is that their operation is undesirably slow. To overcome this problem, some prior art computers having a control store implement their microinstructions in a hardwired pipeline. Basically, this pipeline consists of several hardwired stages; and each stage performs a portion of the microcommand. This architecture decreases the execution time of the microcommands, since it provides a means for executing the microcommands in an overlapped fashion. For example, in a two stage pipeline, one stage of the pipeline will be executing one microcommand while the other stage of the pipeline will be fetching the next microcommand to be executed. A problem with these computers however, is that each of the stages are comprised of hardwired special purpose logic which increases the complexity and irregularity of the machine.

A technique for increasing the speed of operation even further in a computer having a hardwired pipeline is to increase the complexity of the microcommands themselves. That is, as each microcommand is made to do more things, a smaller number of them are required to be combined to form the programs which execute the instructions of the higher level language. Accordingly, the high level language instructions execute faster. A problem with this approach however, is that as the microinstructions become more complex, so does the hardware which is required to implement them. As a result, a computer having both a hardwired pipeline and a complex microinstruction set no longer resembles a regular structure. Instead it is often more complex than a completely hardwired computer.

It is therefore one object of the invention to provide an improved architecture for a digital computer.

Another object of the invention is to provide a pipelined computer having stages which consist of the same identical hardware.

Another object of the invention is to provide a pipelined computer having stages which are separate microprogrammed computers.

Another object of the invention is to provide a pipelined computer having stages which individually are pipelined computers.

Still another object of the invention is to provide a pipelined computer having stages which individually are comprised of microprogrammed computers with writable control stores.

SUMMARY OF THE INVENTION

These and other objects are accomplished in accordance with the invention by a pipelined computer wherein each stage of the pipeline is a microprogrammed digital computer. That is, each stage is "computerized", in effect a computerized computer. A memory holds the high level language instructions which are to be performed by the pipelined computer. The plurality of digital computers which comprise the stages couple to the memory and are intercoupled to each other through an interlocking bus. These computers and bus form the pipeline for executing the high level language instructions. In one embodiment, the computers of each stage have the same identical hardware. Also, preferably, each of these computers includes its own hardwired pipeline for executing their respective microprograms. Also preferably, the control store of each of these computers is writable. This enables multiple sets of microprograms to be stored therein to execute corresponding sets of the high level language instructions with no change in hardware.

DESCRIPTION OF THE DRAWINGS

Specific embodiments of the invention, as well as other features and advantages thereof, will best be understood by reference to the following detailed description when read in conjunction with the accompanying drawings wherein:

FIG. 1 is a block diagram of a pipelined computer constructed according to the invention.

FIG. 2 is a diagram illustrating a format of one high level language instruction set which is executed by the pipelined computer of FIG. 1.

FIG. 3 is a set of tables listing tasks which the various computers perform within the pipelined computer of FIG. 1.

DETAILED DESCRIPTION

Figure 4:
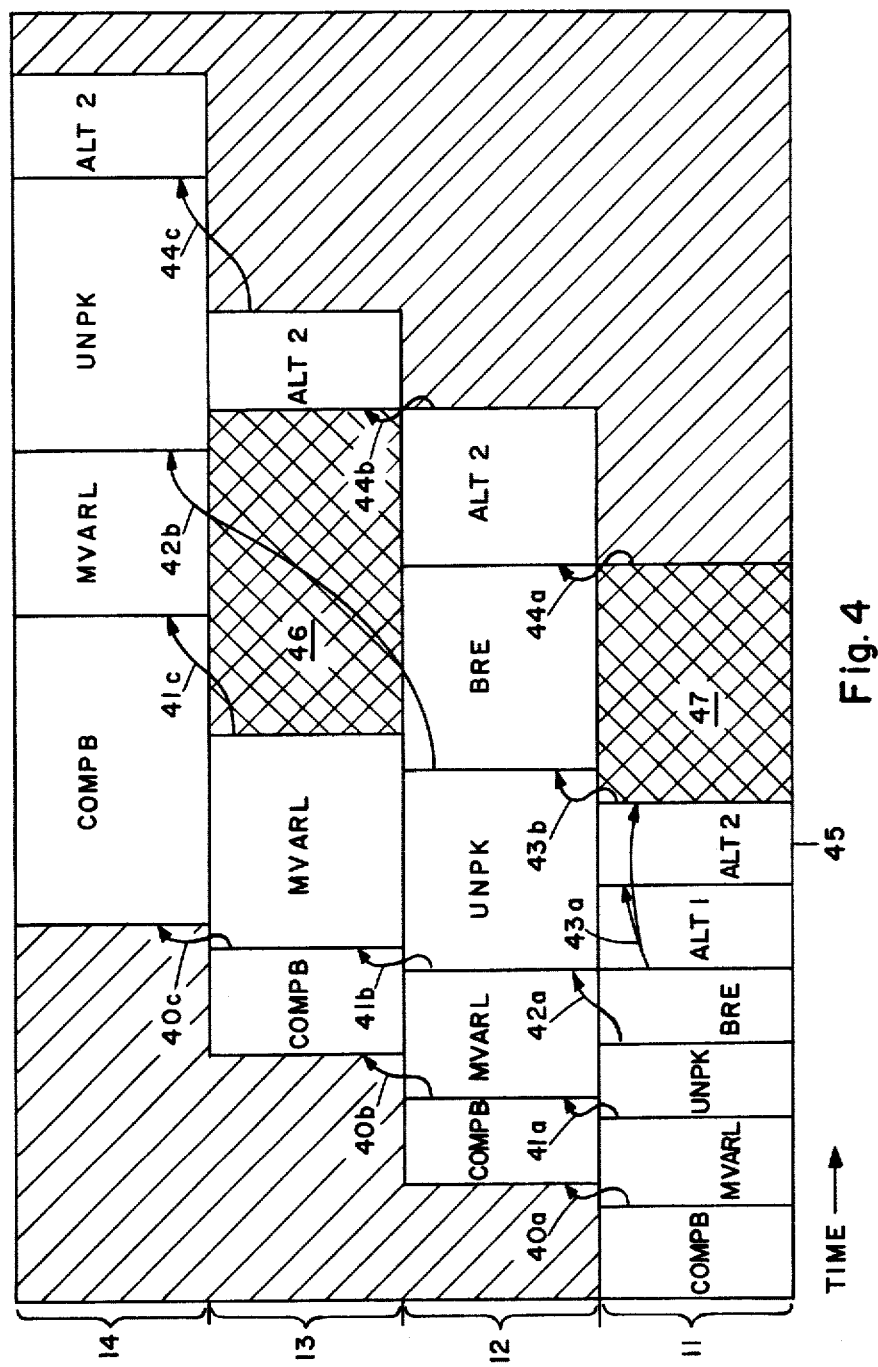
FIG. 4 is a timing diagram illustrating the overlap operation of the pipeline of the pipelined computer of FIG. 1.

A preferred embodiment of a pipelined computer constructed according to the invention will now be described in conjunction with FIG. 1. This embodiment includes a digital memory 10 for storing therein programs comprised of high level language instructions. Also included are a plurality of microprogrammed digital computers 11-14 having respective control store memories 11a-14a for their microprograms. Computers 11-14 also respectively have interfaces 15-18 to memory 10. An interlocking bus 19 intercouples computers 11-14 to form a pipeline for executing the high level language instructions in memory 10. Each of the computers 11-14 is a separately microprogrammable stage of this pipeline.

Basically, this pipeline operates as follows. Computer 11 executes its microprogram in control store 11a, which operates to fetch the high level language instructions from memory 10. These fetched instructions also are aligned in a predetermined format and loaded into registers 20 in pipeline 19 under microprogram control. Computer 12 executes its microprogram in control store 12a, which operates to receive the aligned instructions from register 20 and calculate the memory addresses of the operands for these instructions. The calculated addresses are also loaded into register 21 under microcode control.

Computer 13 executes its microcode in control store 13a to receive the addresses from register 21, and fetches from memory 10 a portion of the operands which are indicated by the addresses. These operands and corresponding addresses are loaded into a register 22 within bus 19. Computer 14 executes microcode in control store 14a to receive the operand and addresses in register 22, and performs operations on the operand as specified by the high level language instruction. Computer 14 also fetches from memory 10 any remaining portions of the operand and performs thereon the operation specified by the high level language instruction.

Also included in the illustrated preferred embodiment are registers 23, 24 and 25. Register 23 is included within bus 19 to provide a means for computer 12 to transfer the calculated operand addresses of the high level language instructions directly to computer 14. In operation, computer 12 sends the results of its processing of the high level language instruction either to computer 13 or computer 14 depending on the particular high level instruction that is being processed. Register 24 and 25 provide a means whereby computers 14 and 12 respectively can indicate the results of their operation to computers lying upstream in the pipeline. These results are indicated by various flags and branch control information for example. The precise tasks performed by computers 11-14 and the information which they transfer via registers 20-25 will be explained in greater detail in conjunction with FIG. 3.

In one preferred version of the FIG. 1 embodiment, computers 11-14 each consist of the same identical hardware. That is, computers 11-14 differ only in their respective microprograms. Accordingly, this version has an extremely regular architecture. It also increases the volume of the single computer that is used for each of the stages by a factor of four over the volume of the pipelined computer. This increased volume translates to a reduced cost for the pipelined computer. Also, the regularized structure decreases the complexity of the pipelined computer, which makes for ease of design and maintenance.

Also preferably, each of the computers 11-14 execute their respective microprograms in their own internal pipeline. That is, computers 11-14 preferably each include a plurality of hardwired execution stages which are interconnected in a pipeline. The pipeline within computer 11 executes the microprograms in control store 11a of computer 11; the pipeline in computer 12 executes the microprograms in control store 12a of computer 12; etc. Any number of stages may comprise the respective pipelines within computers 11-14. For example, computers 11 and 14 may each include a three stage pipeline while computers 12 and 13 may each include a two stage pipeline. At the same time of course, computers 11-14 each form one stage of the pipelined computer having higher level language instructions in memory 10.

In addition, control stores 11a-14a preferably are each writable control stores. That is, modifiable microprograms can be stored therein. This provides a means whereby one set of microprograms can be stored in control stores 11a-14a during one time interval to execute one set of high level language instructions; while a second set of microprograms can be stored in control stores 11a-14a during a second time interval to execute a corresponding second set of high level language instructions.

A format for one set of high level language instructions, and their associated operands, which is suitable for being processed by the disclosed pipelined computer is illustrated in FIG. 2. These instructions are the machine language of a Century 100 processor as described in the publication entitled "615-100 Functional Specification" from NCR Corporation. Basically, these high level language instructions have a double stage format 30 and a single stage format 31. Double stage commands 30 include eight bytes of information which are indicated in FIG. 2 by the squares labeled OP through B1. Single stage command 31 includes four bytes of information as indicated in FIG. 2 by the squares labelled OP through A1.

In formats 30 and 31, the symbol OP represents one of the following operation codes: Pack, Unpack, Add Unsigned, Subtract Unsigned, Add Binary, Subtract Binary, Branch Overflow, Branch Less, Branch On EQual, Branch Less Or Equal, Branch Greater, Branch Less Or Greater, Branch Greater Or Equal, Branch Unconditionally, Move A Right To Left, Compare Binary, Repeat, and Wait. All of these instructions pass through the stages of the pipeline formed by computers 11 and 12. The Add Binary, Subtract Binary, Move A Right To Left, and Compare Binary instructions also pass through computers 13 and 14. In comparison, the Pack, Unpack, Add Unsigned, Subtract Unsigned instructions pass through computer 14 but bypass computer 13.

Each of the above described operation codes can be incorporated into the double stage format 30 or the single stage format 31. Single stage format commands have a B address equal to the B address which results from execution of the preceding command. For example, the B address which results from execution of a Binary Compare command is the same as its initial B address. Accordingly, one task which computer 12 performs is to save fields T-B1 of a double stage command and use them to form the B address for subsequent single stage commands.

Each of the above described operation codes may also be aligned in memory 10 on a double word boundary, or a word boundary. This is indicated at 32 in FIG. 2. Computer 11 has the task of fetching the commands from memory 10, and shifting them so that they are all aligned in register 20 in standard format regardless of how they are aligned in memory 10.

The operands 33 and 34 on which instructions 30 and 31 operate are also illustrated in FIG. 2. The T field indicates the length of operands 33 and 34. Operand 33 is addressed by the fields RA, A2, and A1; while operand 34 is addressed by the fields RB, B2, and B1. RA and RB indicate index registers. Basically, operand 33 is addressed by the contents of index register RA plus the quantity A2A1 as indicated at 35, while operand 34 is addressed by the contents of index register RB plus B2B1 as indicated at 36. Various modifications to this addressing are described in the above cited publication on the Century 100.

FIG. 3 illustrates how the multiple tasks which constitute execution of the high level language instructions of FIG. 2 are partitioned among computers 11–14. As indicated in Table 1, computer 11 pre-fetches up to four sequential high level language instructions from memory 10. If one of these is a branch instruction, computer 11 pre-fetches both alternative instructions that may be executed depending on whether or not the branch is taken. These pre-fetched instructions are aligned into a single predetermined format, and loaded sequentially into register 20. Computer 11 also monitors the state of register 25 to determine if a branch is or is not taken. In response thereto, computer 11 loads the correct alternative instruction into register 20.

Computer 12 receives the instructions which are loaded into register 20. Subsequently, it computes the addresses of the operands for these instructions. That is, it computes the contents of index register RA plus A2A1; and computes the contents of index register B plus B2B1. If register 20 holds a single stage command, then computer 12 calculates the address that results from execution of the preceding command and tacks that on as the B address for the single stage command.

In addition, computer 12 directly executes all branch instructions. It does this by testing the flags in register 24 in accordance with the operation code of the particular branch instruction, and by setting the state of register 25 to indicate that the branch condition either was or was not met. For OP codes which are not a branch, computer 12 passes the calculated operand addresses into either register 21 or 23 in accordance with the particular OP code as previously described in conjunction with FIG. 2.

The function performed by computer 13 during the processing of the Add Binary, Subtract Binary, Move A Right To Left, and Compare Binary instructions is listed in Table 3. First, computer 13 receives the information loaded by computer 12 into the register 21. Subsequently, computer 13 prefetches one word of the A operand. If the bytes therein are not aligned on a word boundary, computer 13 performs no shifting of the alignment. Computer 13 also pre-fetches either one or two words of the B operand as is required to have at least as many bytes of the B operand pre-fetched as there are bytes of the A operand pre-fetched. The pre-fetched operands, and the A and B addresses, are then loaded into register 22 along with several pointers indicating the byte alignment of the A and B operands within the pre-fetched words.

As per TABLE 4, computer 14 receives the addresses and operands from register 22 or 23 depending upon the particular high level language instruction being performed. Any remaining portion of the operands are fetched by computer 14. The operands are also operated on by computer 14 in accordance with the operation code. For some instructions, computer 14 sets flags in register 24 to indicate the results of the operation. These flags are utilized by computer 12 during branch commands as described above.

A timing diagram illustrating how computers 11–14 perform each of their assigned tasks in a pipeline fashion is contained in FIG. 4. This figure illustrates the execution of the commands Compare Binary, Move A Right To Left, Unpack, and Branch On Equal as an example. Specifically, the sequence 40a, 40b, and 40c illustrates how computers 11–14 process the Compare Binary instruction. Similarly, the sequence 41a, 41b, and 41c illustrates how computers 11–14 process the Move A Right To Left instruction. Both of these instructions of the high level language utilize all four stages of the pipeline.

In comparison, the sequence 42a and 42b illustrates how the Unpack command is performed by computers 11–14. As illustrated, only three stages of the pipeline are required to perform this command. Also in comparison, the sequence 43a and 43b illustrates how the Branch On Equal command is performed by computers 11–14. As illustrated, this command utilizes only computers 11 and 12. Computer 11 fetches and aligns the Branch On Equal command, determines that a Branch command has been fetched, and in response thereto fetches two alternate commands. One of the alternate commands will be performed if the Branch condition fails; while the other alternative commands will be performed if the Branch condition is met. Computer 12 tests the flag in register 24 and selects one of the alternate commands based on the result of the test. This is indicated at 44a. After one of the alternate commands has been selected, it proceeds through the pipeline in the normal fashion as indicated at 44b and 44c.

Due to the pipelined interconnection of computers 11–14, the execution of the high level language instruction is overlapped in time. This overlapping is clearly illustrated in FIG. 4. For example, at time instant 45, computers 11–14 respectively are performing portions of the Branch On Equal instruction, the Unpack instruction, the Move A Right To Left instructions, and the Compare Binary instruction. At the same time, each of the computers 11–14 preferably have their own internal hardwired pipeline which is operating to perform their respective microprograms. This point is described in greater detail in conjunction with FIGS. 5 and 6.

When one stage of the pipeline formed by computers 11–14 needs data from the preceding stage and that data is not available, the stage which needs the data enters into a freeze state until the data is available. This is indicated at 46 and 47 in FIG. 4. Specifically, the freeze state at 46 illustrates the condition where computer 13 has finished processing its portion of the Move A Right To Left command and is waiting for the next command for which it has tasks to perform. In this illustrated example, this command is the second alternative of the branch command.

Similarly, the freeze state at 47 illustrates the case where computer 11 waits for computer 12 to determine which alternative of a branch condition is to be executed. Subsequent to that determination, computer 11 continues in its normal fashion to pre-fetch up to four sequential commands along the branch path which was taken. One preferred embodiment of bus 19 which implements this freeze function is illustrated and described in conjunction with FIG. 7.

Figure 5:
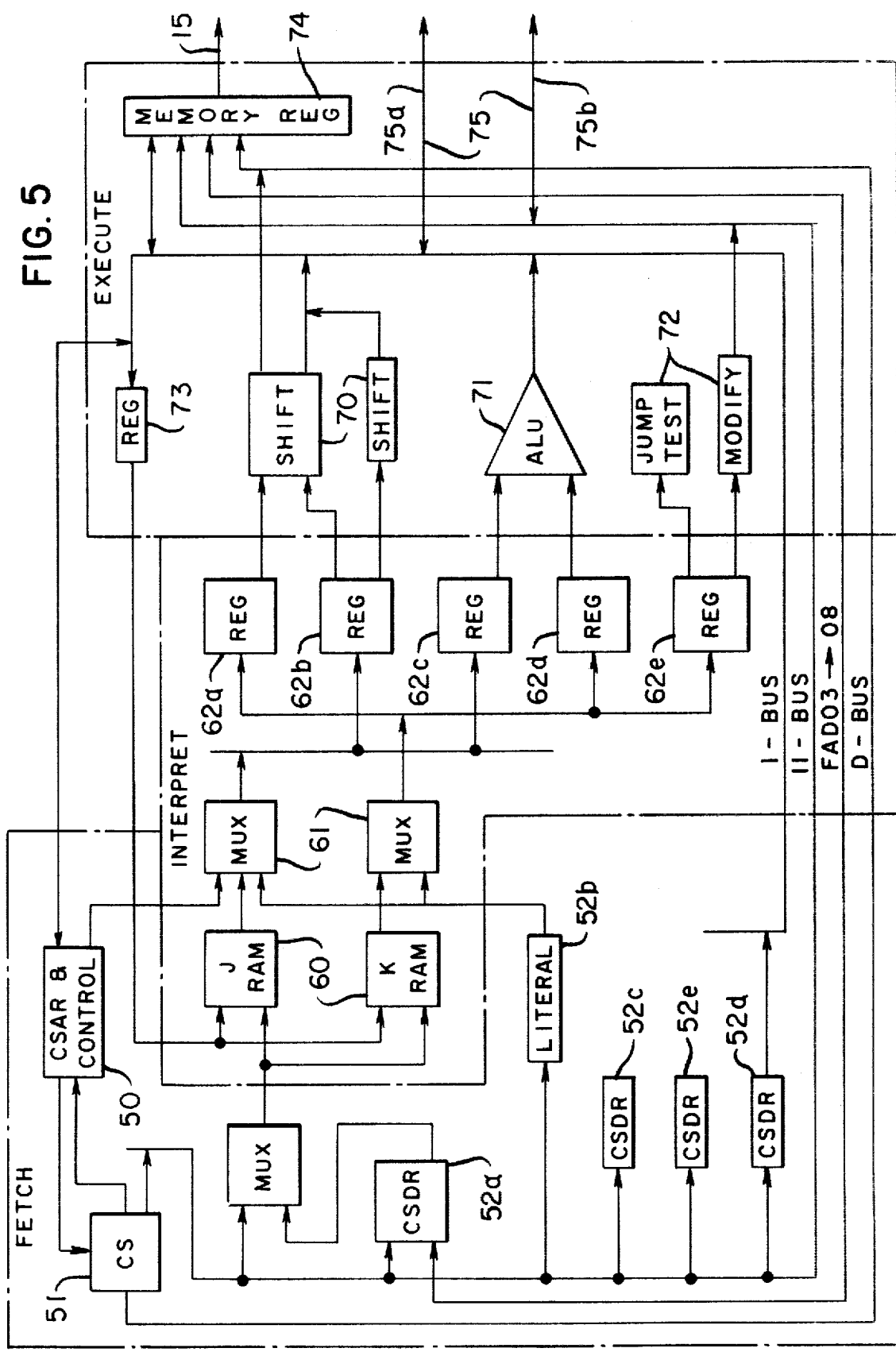
FIG. 5 is a block diagram of a hardwired three stage pipeline microprogrammed digital computer which comprises one of the microprogrammable stages of the pipelined computer of FIG. 1.

Referring now to FIG. 5, there is illustrated a block diagram of a computer which suitably may be used as each of the computers 11–14. That is, four of the computers of FIG. 5 are included within the pipelined computer of FIG. 1. The computer of FIG. 5 has its own three stage pipeline. These are termed the Fetch stage, the Interpret stage, and the Execute stage. Each of these stages are implemented by hardwired logic. This logic is defined in great detail in the publication "56-101 Processor Sub-system Functional Specification" from NCR Corporation.

Basically, the Fetch stage includes a control store address register and branch control logic 50, a control store memory 51, and control store data registers 52a–52e. These registers are partitioned to receive various portions of the microcommands which are read from control store memory 51. For example, register 52a receives and decodes a portion of the microcommands which addresses a register storage unit 60 within the Interpret stage.

The Interpret stage of the pipeline also includes a multiplexer 61, and buffer registers 62a–62e. Registers 62a and 62b form inputs to byte and bit shifting logic 70 which lies within the Execute stage. Registers 62c and 62d form inputs to an arithmetic logic unit 71 within the Execute stage. And register 62e forms an input to jump test logic and modify logic 72 within the Execute stage. The Execute stage also includes a buffer register 73 for the register storage unit 60. It further includes memory interface registers 74. Registers 74 couple via leads 15 to memory 10 as was previously described in conjunction with FIG. 1.

A bus 75 interconnects units 71–74 and registers 20–25 of FIG. 1. For example, bus 75 of computer 12 couples to registers 20, 21, 23, 24, and 25. Similarly, bus 75 of computer 13 couples to registers 21 and 22. Additional details of the lines and signals within bus 75 are described in conjunction with FIG. 7.

Figure 6:
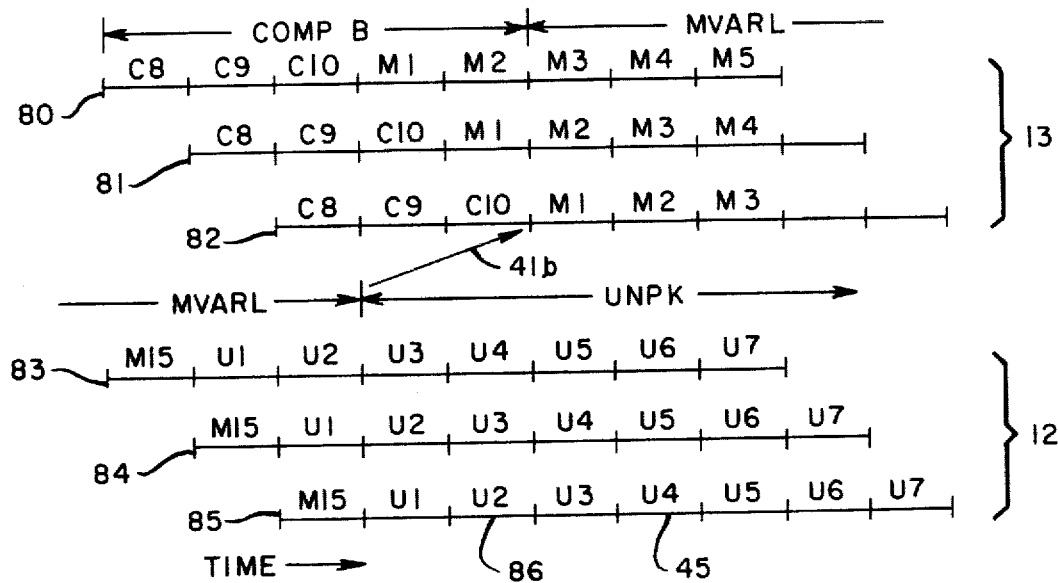
FIG. 6 is a timing diagram illustrating the operation of the hardwired pipeline of the computer of FIG. 5 in conjunction with the microprogrammed stages within the pipelined computer of FIG. 1.

Referring now to FIG. 6, there is illustrated the detailed timing of how the multiple pipelines within the pipelined computer of FIG. 1 interact with each other. Transition 41b in FIG. 6 corresponds to transition 41b and the timing diagram of FIG. 4. Near this transition, computer 13 operates on the Compare Binary command and the Move A Right To Left command. Simultaneously, computer 12 operates on the Move A Right To Left command and the Unpack command.

In FIG. 6, reference numerals 80–82 respectively refer to the microinstructions in the Fetch stage, the Interpret stage, and the Execute stage of computer 13. Similarly, reference numerals 83–85 respectively refer to the microcommands in the Fetch stage, the Interpret stage, and the Execute stage of computer 12. Also, the mnemonics M1, M2, etc. refer to the first, second etc. microcommand of the program, in the corresponding stage, for the Move A Right To Left command; the mnemonics U1, U2, etc. refer to the first, second, etc. microcommand of the programs for the Unpack command; and the mnemonics C8, C9 and C10 refer to the eighth, ninth and tenth microcommand of the programs for the Compare Binary command.

At the previously described time instant 45 for example, the Fetch stage, the Interpret stage, and the Execute stage of computer 13 respectively operate on the fourth, third, and second microcommands in control store 13a which performs a portion of the Move A Right To Left command. Simultaneously, the Fetch stage, the Interpret stage, and the Execute stage of computer 12 respectively operate on the sixth, fifth, and fourth microcommand in control store 12a which performs a portion of the Unpack command. Similarly, at a time instant 86, the Fetch stage of computer 13 operates on the second microcommand of the Move A Right To Left command; the Execute stage of computer 13 operates on the tenth microcommand of the Compare Binary instruction; and the Execute stage of computer 12 operates on the second microcommand of the Unpack instruction. Also at time instants 45 and 86, the pipelines within computers 11 and 14 are operating in a similar overlapped fashion.

Figure 7:
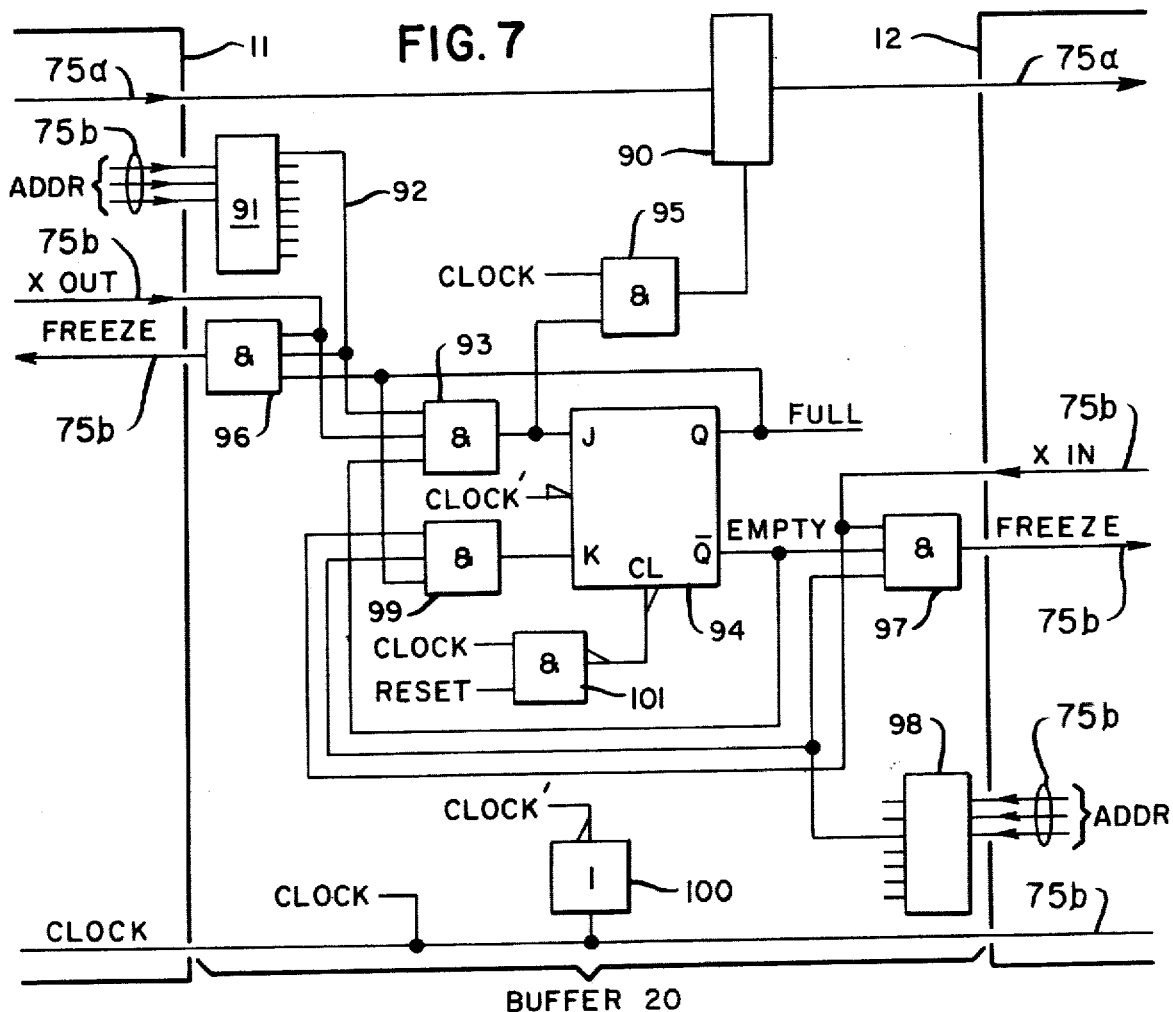
FIG. 7 is a detailed logic diagram of one preferred embodiment of the interlocking bus in the computerized computer of FIG. 1.

The details of the interlocking bus 19 which interconnect computer 11–14 will now be described in conjunction with FIG. 7. This figure is a detailed logic diagram of buffer 20. The other buffer registers 21–25 are of similar structure—the only difference being the number of information bits which is contained in the particular buffer register.

These bits are held in a register 90. Register 90 is a triggerable D-type register having a plurality of inputs which are loaded from bus 75a in computer 11 and unloaded to bus 75a in computer 12. ADDR signals on bus 75b are utilized to load register 90 and to test register 90 to determine if it is full or empty. To this end, signals ADDR couple to a decoder 91. Decoder 91 operates to select a particular binary code and indicates the presence of that code by a logic level on lead 92. Lead 92 couples to a logical AND gate 93 which operates to set a flip-flop 94 when it is empty; and to load register 90 through an AND gate 95.

A control signal Xout on a lead within bus 75b is an additional enabling signal which is connected to AND gate 93. Signal Xout indicates when computer 11 is executing a microcommand which loads the data on bus 75a into a register as specified by the ADDR code on bus 75b.

An AND gate 96 generates a signal FREEZE on another lead within bus 75b. This FREEZE signal is the logical AND of the FULL signal from flip-flop 94, the address detect signal on lead 92, and the Xout signal. It operates to halt computer 11 when it attempts to load a full register 90.

Similarly, an AND gate 97 provides a FREEZE signal for computer 12 which enables the pipeline in computer 12 to stop when it requests data from an empty register 90. This FREEZE signal is generated on a lead within bus 75b in computer 12. The inputs to gate 97 are generated by a decoder 98 which decodes ADDR signals on bus 75b in computer 12, the empty side of flip-flop 94, and an Xin signal on a lead within bus 75b in computer 12. The Xin signal indicates that computer 12 is requesting data to be put onto bus 75 by the register indicated by the ADDR signals. In comparison, when computer 12 requests data from a full register 90, the pipeline in computer 12 does not stop. Instead, it proceeds to take data from register 90. An AND gate 99 is provided to force flip-flop 94 to the EMPTY state after this data transfer occurs.

Timing signals are also provided for synchronizing all of the above described operations. These signals are called CLOCK and CLOCK'. An inverter 100 generates signal CLOCK' from signal CLOCK. Suitably, these signals are square waves with a 50 NS period. Also, a RESET signal and a NAND gate 101 are included to initialize flip-flop 94 to an EMPTY state whenever the entire system is reset.

This completes the disclosure of the embodiment of FIG. 1. It should be pointed out however, that many modifications and changes may be made to the FIG. 1 embodiment without departing from the nature and spirit of the invention. For example, the pipelined computer of FIG. 1 may be scaled up to include additional ones of the computers 11-14 within the interlocking interface 19, or it may be scaled down to include as few as two of the computers 11-14. Basically, as the number of computers is increased, the amount of overlap in the pipeline increases. Conversely, as the number of computers is decreased, the amount of overlap in the pipeline decreases. The tasks which each stage of the pipeline must perform may be assigned various ways as was described in conjunction with FIG. 3.

As another alternative, the pipelined computer of FIG. 1 may be expanded to include one or more hardware assist units. For example, a special hardwired assist unit which does high speed multiples and high speed divides may couple to computer 14. In operation, computer 14 would pass the operands to the hardware assist unit and receive the result therefrom. As another example, the hardware assist unit could couple directly between computers 12 and 13 to perform the extended set-up. In this configuration, only computers 11, 12 and 14 would be microprogrammed. This configuration would be attractive if the logic required to do the assigned tasks were relatively simple.

As still another variation to the pipelined computer of FIG. 1, additional levels of buffering may be included in the interlocking bus 19. That is, multiple registers 90 may be interconnected in stacks between computers 11-14. In this embodiment, control logic similar to that illustrated in FIG. 7 would generate a suitable FREEZE signal to indicate when the stack was full or empty. The stack could suitably be constructed out of commercially available stack chips, such as an 8X03 chip from Signetics for example.

Accordingly, since many changes and modifications can be made to the disclosed embodiments without departing from the nature and spirit of the invention, it is to be understood that the invention is not limited to said embodiments, but is defined by the appended claims.

We claim:

1. In a pipelined computer, having a memory means for storing programs of high level language instructions and a plurality of microprogrammed digital computer means wherein each one of said plurality of microprogrammed digital computer means forms a stage of said pipelined computer, said pipelined computer having n-stages, and wherein each of said plurality of microprogrammed digital computer means is coupled to said memory means, an interlocking bus, comprising:

(n-1) buffer means, each one of said buffer means coupled between consecutive ones of said plurality of microprogrammed digital computer means for providing a predetermined level of buffering therebetween, said buffer means also comprising;

(a) a register means for holding a quantum of data therein, said register means having an input terminal adapted to receive said quantum of data and having an output terminal adapted to transmit said quantum of data, wherein said input terminal is operatively connected to one of said plurality of microprogrammed digital computer means and said output terminal is operatively connected to the next consecutive stage of said plurality of microprogrammed digital computer means; and (b) synchronizing means, operatively connected between the same consecutive stages of said microprogrammed digital computer means as said register means, and further operatively connected to said register means, said consecutive stages of said plurality of microprogrammed digital computer means being an $i^{th}$-stage and an $(i+1)$-stage, said synchronizing means having a first and second output terminal for transmitting a halt control signal, said first output terminal operatively connected to the $i^{th}$-stage of said microprogrammed digital computer means and said second output terminal operatively connected to the $(i+1)$-stage of said microprogrammed digital computer means, said synchronizing means cooperating with said register means, for halting said $(i+1)$-stage of said microprogrammed digital computer means when attempting to read said register means if said register means is empty or for halting said $i^{th}$-stage of said microprogrammed digital computer means when attempting to load said register means if said register means is full.

2. An interlocking bus, according to claim 1, further comprising at least one register means for transmitting said quantum of data to a non-consecutive stage of said microprogrammed digital computer means.

3. An interlocking bus, according to claim 2, wherein said register means comprises a triggerable D-type register.

* * * * *